US009948545B2

(12) United States Patent
Morosan et al.

(10) Patent No.: US 9,948,545 B2
(45) Date of Patent: Apr. 17, 2018

(54) APPARATUS AND METHOD FOR FAILOVER OF DEVICE INTERCONNECT USING REMOTE MEMORY ACCESS WITH SEGMENTED QUEUE

(71) Applicant: TSX INC., Toronto (CA)

(72) Inventors: Tudor Morosan, Toronto (CA); Gregory Arthur Allen, Oakville (CA)

(73) Assignee: TSX INC., Toronto (CA)

( * ) Notice: Subject to any disclaimer, the term of this patent is extended or adjusted under 35 U.S.C. 154(b) by 50 days.

(21) Appl. No.: 14/891,923

(22) PCT Filed: Jun. 12, 2014

(86) PCT No.: PCT/CA2014/000498
§ 371 (c)(1),
(2) Date: Nov. 17, 2015

(87) PCT Pub. No.: WO2014/197975
PCT Pub. Date: Dec. 18, 2014

(65) Prior Publication Data
US 2016/0149801 A1    May 26, 2016

Related U.S. Application Data

(60) Provisional application No. 61/834,577, filed on Jun. 13, 2013.

(51) Int. Cl.
H04L 12/707    (2013.01)
H04L 29/14     (2006.01)
H04L 29/06     (2006.01)

(52) U.S. Cl.
CPC .............. H04L 45/22 (2013.01); H04L 69/14 (2013.01); H04L 69/40 (2013.01)

(58) Field of Classification Search
CPC ...... H04L 1/22; H04L 49/557; H04L 41/0654; H04L 45/22; H04L 45/28; H04L 41/0659;
(Continued)

(56) References Cited

U.S. PATENT DOCUMENTS 5,502,733 A * 3/1996 Kishi ................. G06F 11/1443
                                                         714/748
6,208,616 B1 * 3/2001 Mahalingam ............ G06F 1/20
                                                          370/216
(Continued)

FOREIGN PATENT DOCUMENTS

EP    1515511 A2    3/2005
EP    2479670 A2    7/2012
WO    2011044396 A2 4/2011

OTHER PUBLICATIONS

Extended European Search Report dated Dec. 8, 2016 for European Patent Application No. 14810695.
(Continued)

Primary Examiner — Kashif Siddiqui
(74) Attorney, Agent, or Firm — Perry + Currier Inc.

(57) ABSTRACT

A first remote memory access link is established between a first communications interface card on the first computing device and a second communications interface card on the second computing device. In response to an error associated with the first remote memory access link, messages are copied from a segmented queue associated with the first communications interface card to a segmented queue associated with a third communications interface card on the first computing device. A second remote memory access link between the third communications interface card and a fourth communications interface card is activated on the second computing device, and messages are resent from the segmented queue associated with the third communications interface card to the fourth communications interface card (Continued)

through the second remote memory access link. The second computing device discards duplicate received messages, if any.

24 Claims, 10 Drawing Sheets

(58) Field of Classification Search
CPC ....... H04L 69/40; H04L 49/555; H04L 69/14;
G06F 11/08; G06F 11/20; G06F 11/1423;
G06F 11/16
USPC .................................................. 370/241–252
See application file for complete search history.

(56) References Cited

U.S. PATENT DOCUMENTS

| | | | |
|---|---|---|---|
| 6,941,396 B1* | 9/2005 | Thorpe | G06F 3/0613 707/999.202 |
| 7,281,030 B1 | 10/2007 | Davis | |
| 7,356,633 B2 | 4/2008 | Torudbakken et al. | |
| 7,526,577 B2 | 4/2009 | Pinkerton et al. | |
| 7,826,348 B2* | 11/2010 | Farinacci | H04L 12/1877 370/228 |
| 8,305,879 B2 | 11/2012 | Gregg | |
| 2004/0081082 A1* | 4/2004 | Moody, II | G06F 11/1443 370/217 |
| 2005/0125557 A1* | 6/2005 | Vasudevan | G06F 11/2041 709/239 |
| 2007/0058528 A1* | 3/2007 | Massa | G06F 11/2005 370/218 |
| 2007/0153795 A1* | 7/2007 | Devereux | H04L 45/02 370/392 |
| 2007/0174723 A1* | 7/2007 | Cardona | G06F 11/2005 714/43 |
| 2008/0109526 A1* | 5/2008 | Subramanian | H04L 69/40 709/212 |
| 2008/0112311 A1 | 5/2008 | Hariharan et al. | |
| 2008/0239945 A1 | 10/2008 | Gregg | |
| 2010/0020717 A1* | 1/2010 | McGregor | H04B 17/309 370/252 |
| 2010/0097926 A1* | 4/2010 | Huang | G06F 11/2005 370/219 |
| 2012/0166886 A1 | 6/2012 | Shankar et al. | |
| 2013/0204656 A1 | 8/2013 | Mahfouda et al. | |
| 2013/0332767 A1* | 12/2013 | Fox | G06F 15/167 714/4.3 |
| 2014/0040659 A1* | 2/2014 | Wassermann | G06F 11/2005 714/4.21 |
| 2014/0181241 A1* | 6/2014 | Manula | H04L 67/1097 709/217 |
| 2014/0347981 A1* | 11/2014 | Rangne | H04L 1/22 370/228 |

OTHER PUBLICATIONS

International Search Report issued by the Canadian Intellectual Property Office dated Aug. 12, 2014 for corresponding International Patent Application No. PCT/CA2014/000498 filed Jun. 12, 2014.
Written Opinion of the International Authority issued by the Canadian Intellectual Property Office dated Aug. 12, 2014 for corresponding International Patent Application No. PCT/CA2014/000498 filed Jun. 12, 2014.
International Preliminary Report of Patentability issued by the International Bureau dated Dec. 15, 2015 for corresponding International Patent Application No. PCT/CA2014/000498 filed Jun. 12, 2014.

* cited by examiner

APPARATUS AND METHOD FOR FAILOVER OF DEVICE INTERCONNECT USING REMOTE MEMORY ACCESS WITH SEGMENTED QUEUE

CROSS-REFERENCE TO RELATED APPLICATION

This application claims priority to U.S. 61/834,577, filed Jun. 13, 2013, the entirety of which is incorporated herein by reference.

FIELD

The present specification relates generally to communications between computing devices, and more particularly to a remote memory access device interconnect failover between two computing devices.

BACKGROUND

Society is increasingly relying on computing devices and networks to interact and conduct business. To achieve a high level of availability demanded in critical systems, unplanned downtime caused by software and hardware defects should be reduced.

Several modern applications demand distributed, cooperative systems where computing devices are capable of communicating rapidly with each other, commonly referred to as clustered computing, grid computing, or high-performance computing. Configurations typically consist of a number of loosely-coupled or tightly-coupled computing devices that exchange data with particularly high throughput and/or low latency in order to cooperatively perform a task that is broken down into smaller, often parallel units of work distributed among the members of the cluster. These applications generally exhibit the following characteristics: (1) complex and high speed, low latency data processing, (2) reliable, high volume, low latency data exchange, and (3) high level of availability, i.e. the ability to provide end-user service on a substantially uninterrupted basis. When implemented, however, existing applications tend to tradeoff between these performance requirements, since, due to their contradictory effects on the system behavior, typical designs tend to have difficulty satisfying all of three characteristics simultaneously, as outlined in greater detail below.

The financial services industry is one example of an industry that demands highly available systems. Other industries include inventory management (order processing) systems, online gaming, air traffic control, and online reservation and auction systems. Indeed, a large number of data processing activities are supported by computer systems utilizing reliable high speed server cluster communication.

Complex and high speed, low latency data processing refers to the ability to perform, in a timely fashion, a large number of computations, database retrievals/updates, etc. and the ability to reliably produce the results in as short a time interval as possible. This can be implemented through parallel processing, where multiple units of work are executed simultaneously on the same physical machine or on a distributed cluster utilizing high speed communication links. In some systems, the outcome of each interaction depends on the outcomes of previously completed interactions. Therefore, the order in which the messages are sent and received should be maintained. The parallel aspects of linking computing devices using multiple links are, by and large, non-deterministic. For example, non-determinism can result from race conditions, scheduling tasks by the operating system, or variable network delays. For example, the time for transmitting a message across each link is unlikely to be identical due at least in part to latency issues.

Reliable, high-volume, low-latency data exchange refers to the ability to move data between computing devices cooperating in a networked cluster, observing requirements for guaranteed, in-order delivery of messages. TCP/IP is commonly used for this purpose. It is a widely used networking protocol, provides the guarantee of ordered delivery, and with recent technology advances, has become available at higher network clocking frequencies, resulting in lower latency transmission capabilities. However, TCP/IP is a complex, sophisticated protocol designed for Internet and wide-area public network applications, and as such, has a considerable number of features for network routing, congestion avoidance, bandwidth optimization, and so forth, requiring additional, processing overhead—making it a less suitable choice for applications requiring a dedicated low-latency data link.

Highly available systems attempt to ensure that the percentage of the availability of a given computer system is as close as possible to 100% of the expected time. Such availability can be implemented through redundant software and/or hardware, which takes over the functionality in case a component failure is detected. In order to succeed in a short time while being transparent to the service running on the system, the failover system needs to replicate the data or state on each computing device using a reliable communication link that can guarantee serialized delivery of replicated data messages. As will be appreciated by those of skill in the art, state replication can be particularly challenging in non-deterministic systems. Additionally, to satisfy the desire for high speed and high reliability, state replication must be performed as rapidly as possible, and the results must be somehow guaranteed. TCP/IP is commonly used for this purpose as well, but its performance is sub-optimal due to the higher latency resulting from substantial processing related to its sophisticated networking features. Examples of low-latency data link technologies are Hypertransport, QPI, NUMAlink, Infiniband, RapidIO and PCI Express (PCIe). Different low-latency data link technologies vary in the design trade-offs between flexibility and extensibility versus latency and communication overhead. Some low-latency data link technologies, such as Hypertransport and QPI, do not support computing device interconnect, and are only designed for processor interconnect on a common circuit board. Of the data link technologies that are designed for device interconnect, some have sacrificed lowest possible latency to provide better scalability and networking features, and some require costly, proprietary hardware implementations. A growing number of modern applications require high availability and low-latency device interconnect but do not require sophisticated networking capabilities among a large number of computing devices. And yet, for these applications to perform effectively, they do require the device interconnect to provide the lowest possible latency of message exchange, and to achieve this on a cost-effective basis. To achieve the lowest possible latency, a device interconnect needs to forego features not required by a clustered application, and to minimize the number of processing steps necessary to achieve data transfer.

Remote memory access is one approach that achieves efficient data transfer. Message data is transferred directly from a sending application's memory to a receiving application's memory, without copying data to and from the computer operating system, and without intervening layers of unneeded network routing protocol processing that increase latency. Two commonly used examples of remote memory access are Remote Direct Memory Access (RDMA) and Programmed Input/Output (PIO). Infiniband and PCIe are two device interconnect technologies that support remote memory access. Infiniband is a widely used cluster interconnect that includes a network layer and adds routing information to data packets allowing support of larger networked clusters. However, Infiniband is not implemented natively on the same silicon as commonly used processors, requiring the additional step of translation between Infiniband and PCIe at each computing device endpoint, resulting in additional latency and reduced throughput. Applications requiring only small clusters of computing devices do not require complex network routing capability and the additional overhead of the network routing layer adds unnecessary latency. PCIe is a high-speed serial computer expansion bus standard that was developed primarily as a printed circuit board-level interconnect to interface expansion cards with processors on computer motherboards. PCIe has become ubiquitous in many categories of computing devices and is now natively implemented on processor silicon, further reducing its latency. The use of PCIe over external cables has only recently been developed, and its use as a cluster interconnect is not common, however the increasing performance of later versions of the PCIe standard, the availability of inexpensive PCIe networking devices and the exceptionally low latency afforded by PCIe technology makes it increasingly attractive as a low-latency device interconnect for small application clusters requiring cost-effective low-latency device interconnects.

Although remote memory access can achieve extremely low latency data transfer, it comes with some disadvantages. Because message data is delivered directly into application memory, there is no notification to the receiving application that data has arrived. Another disadvantage is that it provides no protocol for the marshalling and un-marshalling of messages at the application level. Provision of conventional queuing mechanisms at the application level to satisfy this need contributes substantial overhead processing and network transfer operations for the exchange of queue management control information, defeating the goal of achieving the lowest possible latency of message transfer. Because low latency data link protocols forego many of the features inherent in higher level protocols like TCP/IP, they tend to lack the ability to recover from transmission gaps and intermittent or complete link failures. The desire for low latency device interconnects within high performance, mission-critical server clusters appears to be at odds with the need for high availability of services provided by such clusters. Low latency device interconnects are often used to link primary computing devices with back-up devices for purposes of data replication as part of a high-availability cluster, and yet the failure of the device interconnect can jeopardize the integrity of that cluster. What is needed is a system and method for achieving fail-over of cost-effective, low-latency, device interconnects that can guarantee serialized, gap-free message transfer between computing devices.

A number of patents attempt to address at least some of the foregoing problems. For example, U.S. Pat. No. 7,356,636 to Torudbakken et al. discloses a link failover facility in a PCI Express switch to allow the host to access all devices connected to the switch to be accessed even if the link between one of the upstream ports and the host fails. The PCI Express switch focuses performing a link failover to restore communication between a host and a device. As another example, U.S. Patent Publication No. 2008/0112311 to Hariharan et al. discloses a method for providing a failover of a communication link in a network. As yet another example, U.S. Patent Publication No. 2008/0239945 discloses a PCI switch assembly having an automatic link failover. However, the current state of the art does not meet the speed and reliability requirements of many systems requiring high availability. While the prior art provides the restoration of communication over PCIe using an external switch, it does not provide a reliable, recoverable mechanism for the guaranteed, gap-free delivery of serialized messages. In particular, the current state of the art does not provide a highly-available, serialized, guaranteed delivery of messages over a low-latency device interconnect.

SUMMARY

According to one aspect of the present invention, a method of device interconnect failover between a first computing device and a second computing device includes establishing a first remote memory access link between a first communications interface card on the first computing device and a second communications interface card on the second computing device, and detecting an error associated with the first remote memory access link. The method further includes, in response to the error, copying messages from a segmented queue associated with the first communications interface card to a segmented queue associated with a third communications interface card on the first computing device, activating a second remote memory access link between the third communications interface card and a fourth communications interface card on the second computing device, resending messages from the segmented queue associated with the third communications interface card to the fourth communications interface card through the second remote memory access link, and the second computing device discarding duplicate received messages, if any.

According to another aspect of the present invention, a system includes a first computing device and a second computing device connected to the first computing device via a first remote memory access link and a second remote memory access link. The first computing device is configured to, in response to detecting an error with the first remote memory access link, copy messages from a segmented queue associated with the first remote memory access link to a segmented queue associated with the second remote memory access link, and resend messages from the segmented queue associated with a second remote memory access link to the second computing device. The second computing device is configured to discard duplicate received messages.

According to another aspect of the present invention, a method of device interconnect failover between a first computing device and a second computing device includes establishing a first remote memory access link between the first computing device and the second computing device, and detecting an error associated with the first remote memory access link. The method further includes, in response to the error, the first computing device copying messages from a segmented queue associated with the first remote memory access link to a segmented queue associated with a second remote memory access link, activating the second remote memory access link between the first computing device and the second computing device, the first computing device resending messages from the segmented queue associated with the first remote memory access link through the second remote memory access link to the second computing device, and the second computing device discarding duplicate received messages, if any.

BRIEF DESCRIPTION OF THE DRAWINGS

Reference will now be made, by way of example only, to the accompanying drawings in which.

DETAILED DESCRIPTION OF THE EMBODIMENTS

Figure 1:
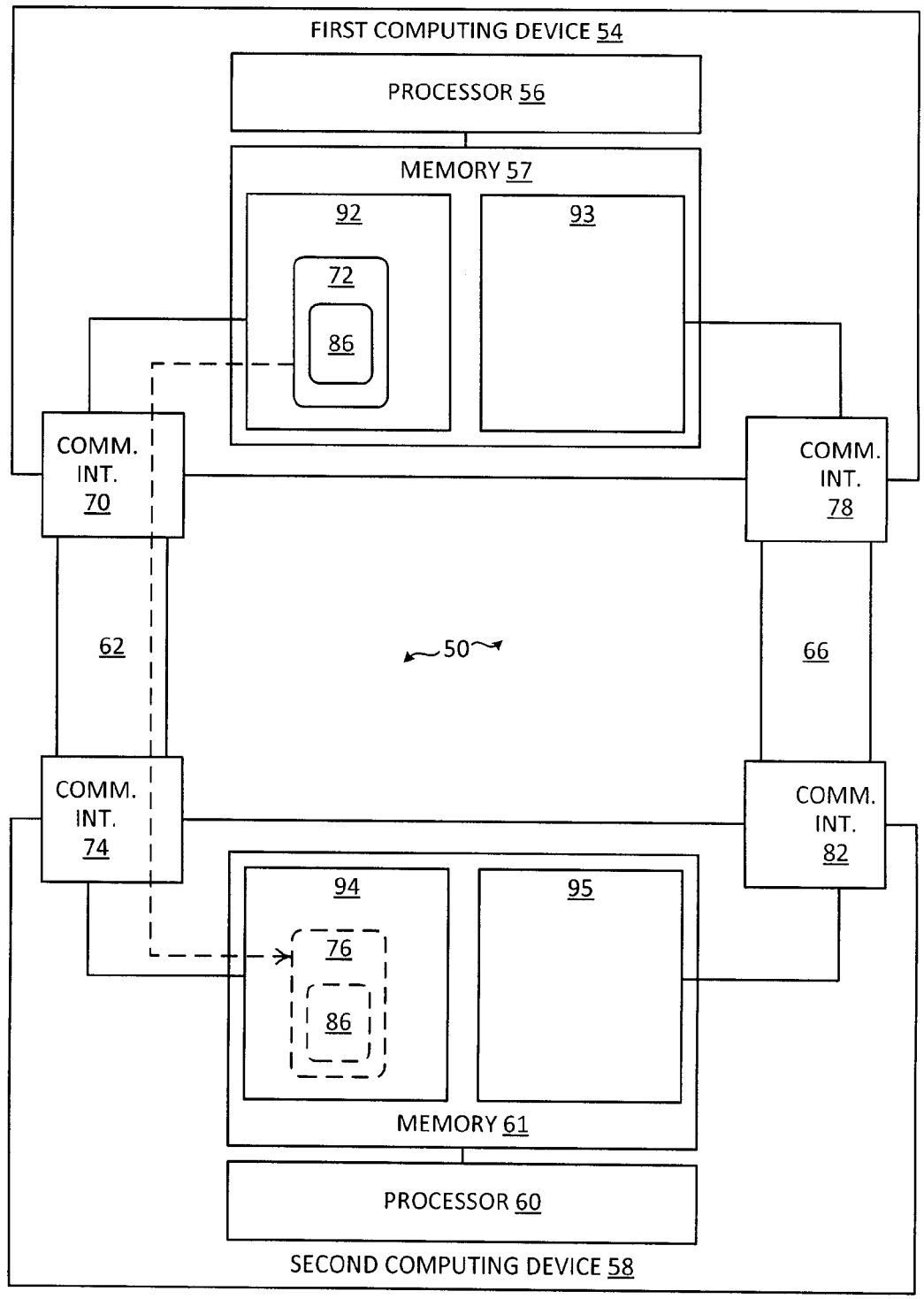
FIG. 1 is a schematic representation of a system for communication link failover in accordance with an embodiment.

Referring now to FIG. 1, a system for failover of a low latency device interconnect utilizing remote memory access between computing devices is generally shown at 50 during normal operation. It is to be understood that the system 50 is purely exemplary and it will be apparent to those skilled in the art that a variety of systems for device interconnect failover between computing devices are contemplated. Various kinds of computing devices can be used in the system 50, such as servers, computers, and other non-limiting examples.

The system 50 includes a first computing device 54 having a first processor 56 and first memory 57 and a second computing device 58 having a second processor 60 and second memory 61. Each of the processors 56, 60 may be single processor, a multi-core processor, a bank of two or more processors, or similar. The computing devices 54, 58 are interconnected by a first link 62 and a second link 66. The first computing device 54 also includes a first communications interface card 70 in communication with the first processor 56 and memory 57 and the second computing device 58 includes a second communications interface card 74 in communication with the second processor 60 and memory 61. The first and second communications interface cards 70, 74 are connected by the first link 62. Furthermore, the first computing device 54 includes a third communications interface card 78 in communication with the first processor 56 and memory 57 and the second computing device 58 includes a fourth communications interface card 82 in communication with the second processor 60 and memory 61. The third and fourth communications interface cards 78, 82 are connected by the second link 66. The communications interface cards 70, 74, 78, 82 may be high-speed serial expansion bus cable adapter cards, such as Peripheral Component Interconnect Express ("PCI Express" or "PCIe") cards. In alternative embodiments, the communication interface cards 70, 74, 78, 82 may be Infiniband Host Channel Adapter (HCA) cards.

Each memory 57, 61 can be divided into a plurality of memory spaces 92, 93 and 94, 95, respectively. Such dividing need not be carried out in any particular manner. The memory spaces 92, 93 and 94, 95 of the respective memory 57, 61 are used to store queues of messages, as will be discussed further below.

In a present embodiment, the first computing device 54 can be any type of computing device generally configured to send, receive or process a queue 72 of messages 86, such as Hewlett Packard DL380 G8 from Hewlett-Packard Company of Palo Alto, Calif., or equivalent running a Linux operating system and having two central processing units each operating at about 2.7 gigahertz and having about 64 gigabytes of random access memory and a non-volatile storage device (not shown) such as a hard disc drive. Another type of computing device suitable for the first computing device 54 is an IBM 3650 M4 from International Business Machines Corp., Armonk, N.Y. Another type of computing device suitable for the first computing device 54 is a HP DL560 Gen8 Server also from Hewlett-Packard Company. However, it is to be emphasized that these particular computing devices are merely exemplary. A vast array of other types of computing environments for the first computing device 54 is within the scope of the invention. The type of messages being sent, received or processed by the first computing device 54, such as the queue 72 of messages 86, is not particularly limited. In the present embodiment, the first computing device 54 operates in an on-line trading system, and is thus able to process messages that include requests to purchase, sell, etc. securities that can be traded on-line. For example, the first computing device 54 can be operable to maintain a central matching engine (not shown), where requests are executed against each other, and against a central repository of orders to thereby process the trading of securities.

Similar to the first computing device 54, the second computing device 58 can be any type of computing device generally configured to send, receive or process a queue 76 of messages 86. In the present embodiment, the second computing device 58 has an identical (or at least substantially identical) computing environment as the first computing device 54. For example, the computing environment including its hardware, operating system, applications can be chosen to render the second computing device 58 operable to substitute the functionality of the first computing device 54 in the event of a failure of the first computing device. It is to be emphasized that the present embodiment is a non-limiting embodiment only. For example, in other embodiments, the first computing device 54 and the second computing device 58 can be implemented with different types of computing environments or as different types of computing devices configured to perform different functions based on the queues 72, 76 of messages 86.

Furthermore, although the system 50 shows the queue 72 of messages 86 continually transmitted from the first computing device 54 to the second computing device 58, it is to be understood that the system 50 is not particularly limited to this single function. For example, the system 50 can be implemented such that the second computing device 58 sends a message to the first computing device 54 to provide two-way communication between the first computing device 54 and the second computing device 58. In a typical implementation of the present embodiment, the first computing device 54 is configured to send a plurality of messages across the first link 62.

The first link 62 is generally configured to carry electronic signals representing messages of the queue 72 between the first computing device 54 and the second computing device 58. In the present embodiment, the first link 62 is a high speed serial expansion bus cable configured to carry electronic signals from the first communication interface card 70 to the second communication interface card 74 using the standard based on the Peripheral Component Interconnect Express ("PCI Express" or "PCIe") standard developed by the Peripheral Component Interconnect Special Interest Group ("PCI-SIG") as described in *PCI EXPRESS 2.0 BASE SPECIFICATION, REV 0.9*.

Figure 2:
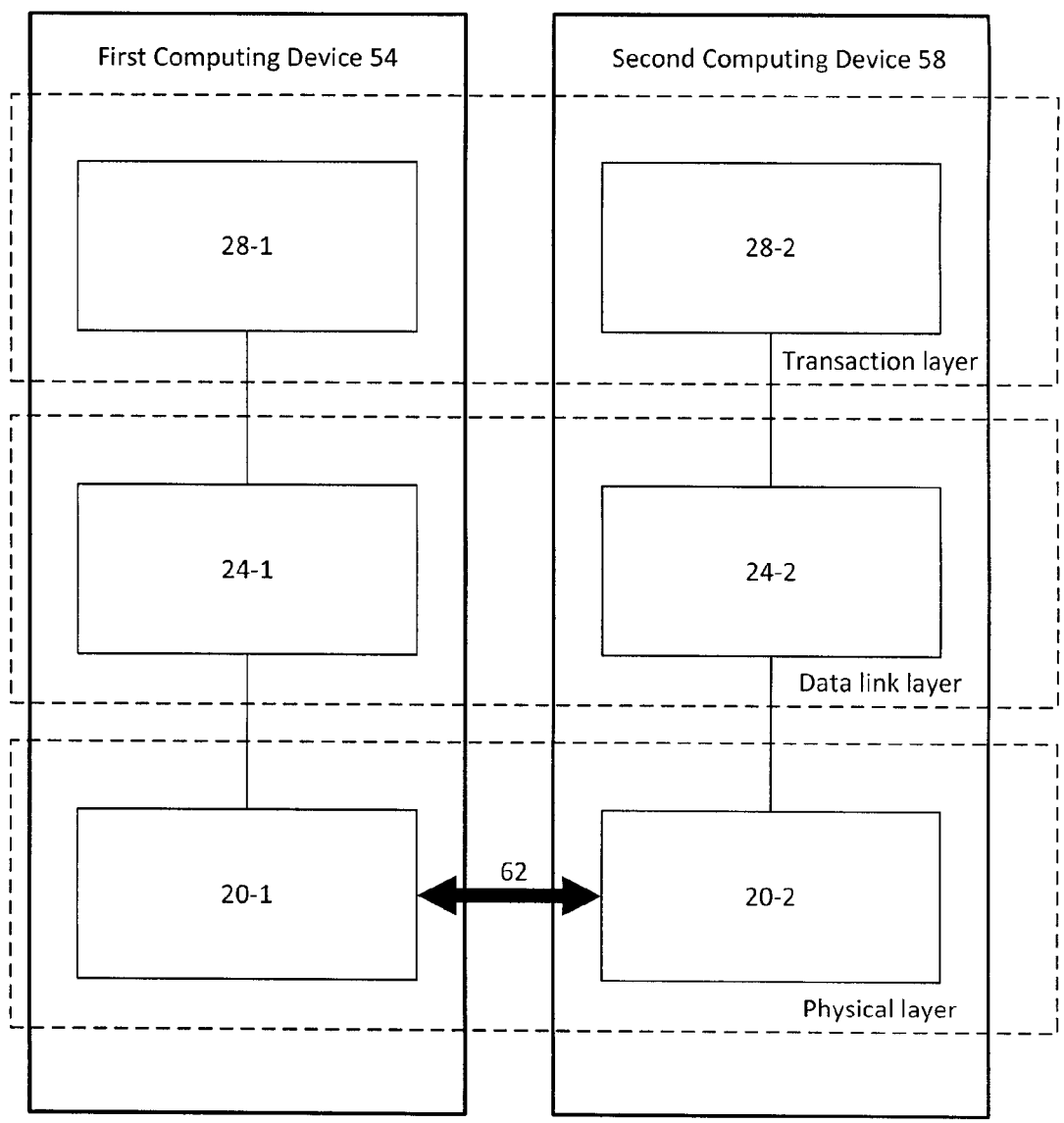
FIG. 2 is a schematic representation of a first and second computing device in accordance with the embodiment shown in FIG. 1.

Referring to FIG. 2, the first three layers of the system 50 in accordance with the Open Systems Interconnection ("OSI") model for characterizing the functions of a communication system are shown. It is to be appreciated that the OSI model is an exemplary model which can be used to describe the PCIe standard and how the first computing device 54 and the second computing device 58 communicate with each other.

In the physical layer, blocks 20-1 and 20-2 represent the physical and electrical components of the first computing device 54 and the second computing device 58 respectively. The physical layer defines the relationship between the first and second computing devices 54, 58 and includes the layout of pins, voltages, cable specifications, hubs, repeaters, communications interfaces, and host bus adapters. In the present embodiment, block 20-1 comprises the first communications interface card 70 and the third communications interface card 78. Block 20-2 comprises the second communications interface card 74 and the fourth communications interface card 82. In addition, the cables of the first link 62 and the second link 66 would also be included in this layer.

In the data link layer, blocks 24-1 and 24-2 represent the protocols used to transfer data between network entities and to detect and correct errors that may occur in the physical layer. For example, the data link layer can include the Infiniband data link layer, or Myrinet. As another example the data link layer can include Institute of Electrical and Electronics Engineers ("IEEE") 802 Local Area Network ("LAN") architecture such as IEEE 802.3. In the present embodiment, block 24-1 comprises the PCIe protocol data link layer operating on the first computing device 54 to provide the transport mechanism used in the physical layer and block 24-2 comprises the PCIe protocol data link layer operating on the second computing device to provide the transport mechanism used in the physical layer.

In the transaction layer, blocks 28-1 and 28-2 represent drivers used to handle data packets and interface to the operating system on the first and second computing devices 54, 58 respectively. In particular, the drivers are primarily configured to implement a remote memory access service, such as Programmed I/O (PIO) or Remote Direct Memory Access (RDMA) for the assembly and disassembly of Transaction Layer Packets ("TLP"s). TLP's are used to communicate transactions, such as read and write, as well as other events. In the present embodiment, the drivers are provided by Dolphin Interconnect Solutions ASA, Innspurten 15, Helsfyr, Oslo, Norway. Therefore, it is to be appreciated, with the description provided herein, that the drivers of blocks 28-1 and 28-2 are configured to interact with the protocols of blocks 24-1 and 24-2.

In the present embodiment, the first link 62 provides a direct physical connection, such as a cable, between the first computing device 54 and the second computing device 58 based on the PCIe standard without the requirement of any intermediary protocols. In particular, all control messages, are sent over the same links used for data in accordance with the PCIe standard. Furthermore, the PCIe standard provides a mechanism for vendors to add extensions and in particular, implementing remote memory access services such that the first computing device 54 can transfer data to a memory address on the second computing device 58 as if the memory of the second computing device 58 is part of the local memory on the first computing device 54. In the present embodiment, PCIe drivers provided by Dolphin Interconnect Solutions ASA, Innspurten 15, Helsfyr, Oslo, Norway provide this remote memory access using Remote Direct Memory Access (RDMA) or Programmed I/O (PIO) between the first computing device 54 and the second computing device 58. In addition, the drivers also provide error codes in the event of an error such as a failed read or write operation. It is to be appreciated that other types of drivers, or custom designed drivers can be used with the PCIe standard to send data across the first link 62 and thus the present teachings are not tied to the Dolphin Interconnect PCIe drivers.

By basing communications on a remote memory access standard, messages 86 of the queue 72 can be transferred directly from memory space on the first computing device 54 via the first link 62 to memory space on the second computing device 58 using fewer operations than other protocols, and without using the computing device operating system. By using fewer operations and not involving the computing device operating system, it is to be appreciated that the system 50 decreases the latency associated with sending messages between two computing devices. Therefore, the system 50 provides a reliable high speed, low latency link for data transmission. Although the present embodiment is based on the PCIe standard, it is to be understood that transmission of data across the first link 62 is not particularly limited to the PCIe standard and that any other suitable standard that supports, or can be extended to support remote memory access can be implemented for transmitting across the first link 62. For example, other standards such as RDMA over Converged Ethernet (RoCE) and iWARP can also be used for remote memory access across the first link 62. Further examples can include successors of the PCIe standard as well as any of the standards mentioned above.

In other embodiments, the protocol used to transmit across the first link 62 can also be implemented as any other type of low latency device interconnect that supports an implementation of remote memory access. Using a device interconnect that omits the overhead of the network layer, or operating system kernel processing can result in fewer operations and thus lower latency for data transfer between the computing devices 54, 58, when compared to device interconnects that include network level services such as bandwidth optimization and traffic management, such as a transmission control protocol and internet protocol ("TCP/IP") link.

Similar to the first link 62, the second link 66 is generally configured to carry electronic signals representing a message 90 (shown in FIG. 4) from the first computing device 54 to the second computing device 58. In the present embodiment, the second link 66 is a cable configured to carry electronic signals from the third communications interface card 78 to the fourth communications interface card 82 based on the PCIe standard. In the present embodiment, under normal operation, the second link 66 is typically operational, but dormant or inactive such that no messages are sent over the second link 66. In other embodiments, the first link 62 and the second link 66 can alternate being a primary link such to reduce the chance of traffic contention and to continuously validate the operability of both links in case one fails and the other must take over sole responsibility for transferring data.

In the present embodiment, the first communications interface card 70 is generally configured to transmit messages 86 of the queue 72 from the first computing device 54 to the second computing device 58 via the first link 62. The first communications interface card 70 is not particularly limited and can be any type of communications interface card that supports remote memory access configured to send messages via a low latency link, such as a PCIe link. Some examples of suitable communications interface cards include communications interface cards for connecting servers via PCIe from One Stop Systems Inc., 2235 Enterprise Street, Escondido, Calif., United States, or cards from Dolphin Interconnect Solutions ASA, Innspurten 15, Helsfyr, Oslo, Norway.

The second communications interface card 74 is generally configured to receive a message from the first computing device 54 via the first link 62, The second communications interface card 74 is not particularly limited and can be any type of communications interface card configured to receive messages via a remote memory access link which can include the types discussed above in connection with the first communications interface card 70. In the present embodiment, the second communications interface card 74 is identical to the first communications interface card 70. However, in other embodiments, the first communications interface card 70 and the second communications interface card 74 can be implemented differently as long as the first communications interface card 70 and the second communications interface card 74 can communicate with each other across the first link 62. For example, the first communications interface card 70 can be implemented as having only transmitting capabilities, whereas the second communications interface card 74 can be implemented as having only receiving capabilities to provide one way communication.

Similar to the first communications interface card 70 and the second communications interface card 74 being configured to communicate via the first link 62, the third communications interface card 78 and the fourth communications interface card 82 are generally configured to communicate with each other via the second link 66. In the present embodiment, the third communications interface card 78 and the fourth communications interface card 82 are identical to the first communications interface card 70 and the second communications interface card 74, respectively. In other embodiments, the third communications interface card 78 and the fourth communications interface card 82 can be implemented as having different capabilities from the first communications interface card 70 and the second communications interface card 74. In further embodiments, the third communications interface card 78 and the fourth communications interface card 82 can use a different communication standard via the second link 66.

Figure 3:
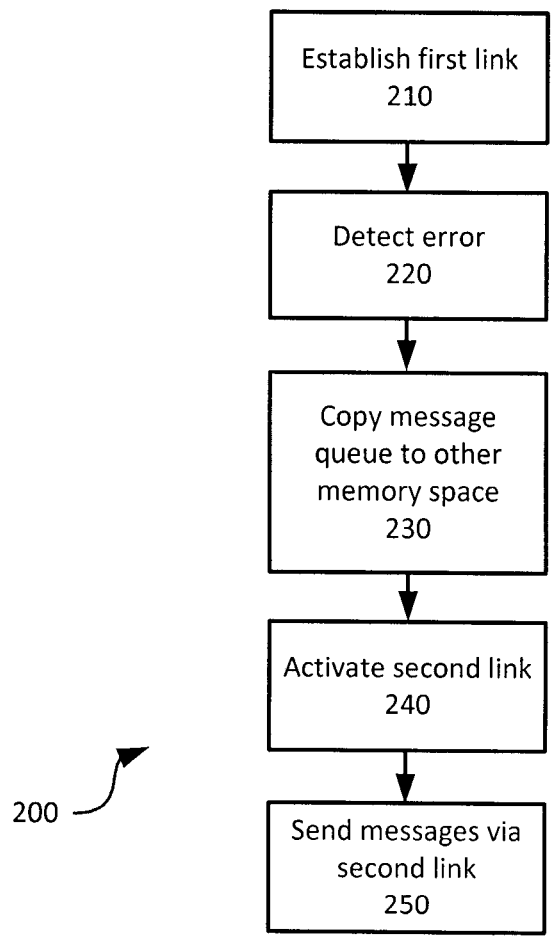
FIG. 3 is a flow chart of a method of communication link failover in accordance with an embodiment.

Referring to FIG. 3, a method for communication link failover between a first computing device 54 and a second computing device 58 is represented in the form of a flowchart and indicated generally at 200. In the present embodiment, the method 200 can be implemented using the system 50. However, it is to be understood that the method 200 is not limited to the system 50 and can be implemented on a wide variety of systems. Furthermore, the following discussion of the method 200 will lead to further understanding of the system 50 and its various components. Although some blocks of the method 200 are indicated as occurring within certain components of the system 50, it is to be understood that the system 50 or the method 200 can be varied, and need not work as discussed herein in conjunction with each other. In addition, it is to be appreciated that the method 200 need not be performed in the exact sequence as shown, hence the elements of the method are referred to herein as "blocks" rather than "steps". For example, a person skilled in the art will appreciate with the benefit of these teachings that the order of some blocks can be interchanged and that some blocks can also be performed in parallel.

Beginning at block 210, the first link 62 connects the first communications interface card 70 and the second communications interface card 74. In the present embodiment, the first link 62 is a cable configured to carry electronic signals from the first communications interface card 70 to the second communications interface card 74 based on the PCIe standard. Therefore, the types of electronic signals carried across the first link 62 are not particularly limited, as long as they implement a protocol that supports a remote memory access standard. In the present embodiment the first link 62 is established when the computing devices 54 and 58 are powered up. In the present embodiment, when the first link 62 is active, driver software generates and sends electronic signals across the first link 62 in accordance with the PCIe protocol standard. In particular, the drivers extend the PCIe standard to allow the first computing device 54 to effectively directly write to a memory address that is physically located on the second computing device 58.

Block 220 comprises detecting whether an error associated with the first link 62 is present. The manner in which the determination is made is not particularly limited and can involve various detection operations which can be carried out by the first computing device 54, the second computing device 58, or both. In the present embodiment, the detection operation can be carried out on the first communications interface card 70 or the second communications interface card 74 using the drivers associated. Alternatively, the detection operation can be carried out on the processors 56 and 60 of the first computing device 54 or the second computing device 58, respectively. For example, the detection operation can involve detecting a checksum error in a message 86 after it is received by the second computing device 58. In the present embodiment, a checksum of each message 86 of the queue 72 is regularly generated using a checksum function at the first computing device 54. The checksum is sent to the second computing device 58 along with the message 86. Upon receiving the message 86 and the checksum at the queue 76 of the second computing device 58, the second computing device 58 applies the same checksum function on the message 86 and compares the results against the checksum received from the first computing device 54. A checksum error occurs when there is a mismatch between the checksum received from the first computing device 54 and the locally generated checksum at the second computing device 58.

The second computing device 58 can alternatively or additionally be configured to send heartbeat messages to the first computing device 54, which determines the presence of an error associated with the first link 62 if the first computing device 54 does not receive a heartbeat message after a predetermined period of time.

In another example, the detection operation can detect whether a message 86 has been sent from the first communications interface card 70. For example, the first computing device 54 can be configured to receive a confirmation message from the second computing device 58 after sending the message 86. If the first computing device 54 does not receive the confirmation message after a predetermined period of time, the detection operation determines that an error has occurred. As yet another example, the second computing device 58 can include a listening service for listening to data from the first link 62 such that if the listening service fails to receive any signals after a predetermined time, the second computing device 58 makes the determination that an error with data transmission across the first link 62 has occurred. Upon detecting the error at the listening service, the second computing device 58 can communicate the error to the first computing device 54 using another link such as the second link 66, or an alternate link (not shown).

It is to be re-emphasized that the detection operations are not particularly limited and that not all detection operations described above are required for the system 50. For example, the detection operations can be carried out on the first computing device 54 alone or the second computing device 58 alone. In addition, other error detection operations for detecting errors in a communication link are also contemplated, such as various software errors or bugs in the protocol which prevents a message 86 from being transmitted successfully. Furthermore, it is to be understood that in other embodiments, a third party device (not shown) can also be used to detect the error in some embodiments. For example, a dedicated device can be used to monitor the messages sent via the first link 62 using an error detection operation to reduce the load on the first computing device 54 and the second computing device 58.

As discussed above, the type of error is not particularly limited to any single type of error and that various types of errors associated with transmission across the first link 62 can occur such as synchronous errors or asynchronous errors. For example, the error can include the listening computing device on the second computing device 58 failing to receive any messages after a pre-determined period of time resulting from an error event in the first communications interface card 70 preventing a message 86 from being transmitted to the first link 62. This error event can include a hardware error in the first communications interface card 70 such as a memory failure or processor overheating. The error event can also include disruption of the physical medium constituting the interconnect cable, such as physical damage to the cable or disconnection of the cable at either end of the cable. Another example of an error involves a checksum error where the second communications interface card 74 receives a message that is not identical to the message 86 transmitted by the first communications interface card 70. A checksum error can occur when an artifact associated with the first link 62 corrupts the message during transmission. Alternatively, the checksum error can also be caused by a failure of either one of the first communications interface card 70 or the second communications interface card 74. Similarly, in embodiments where messages are sent as a message hash, an error can involve an unverifiable message hash.

Figure 4:
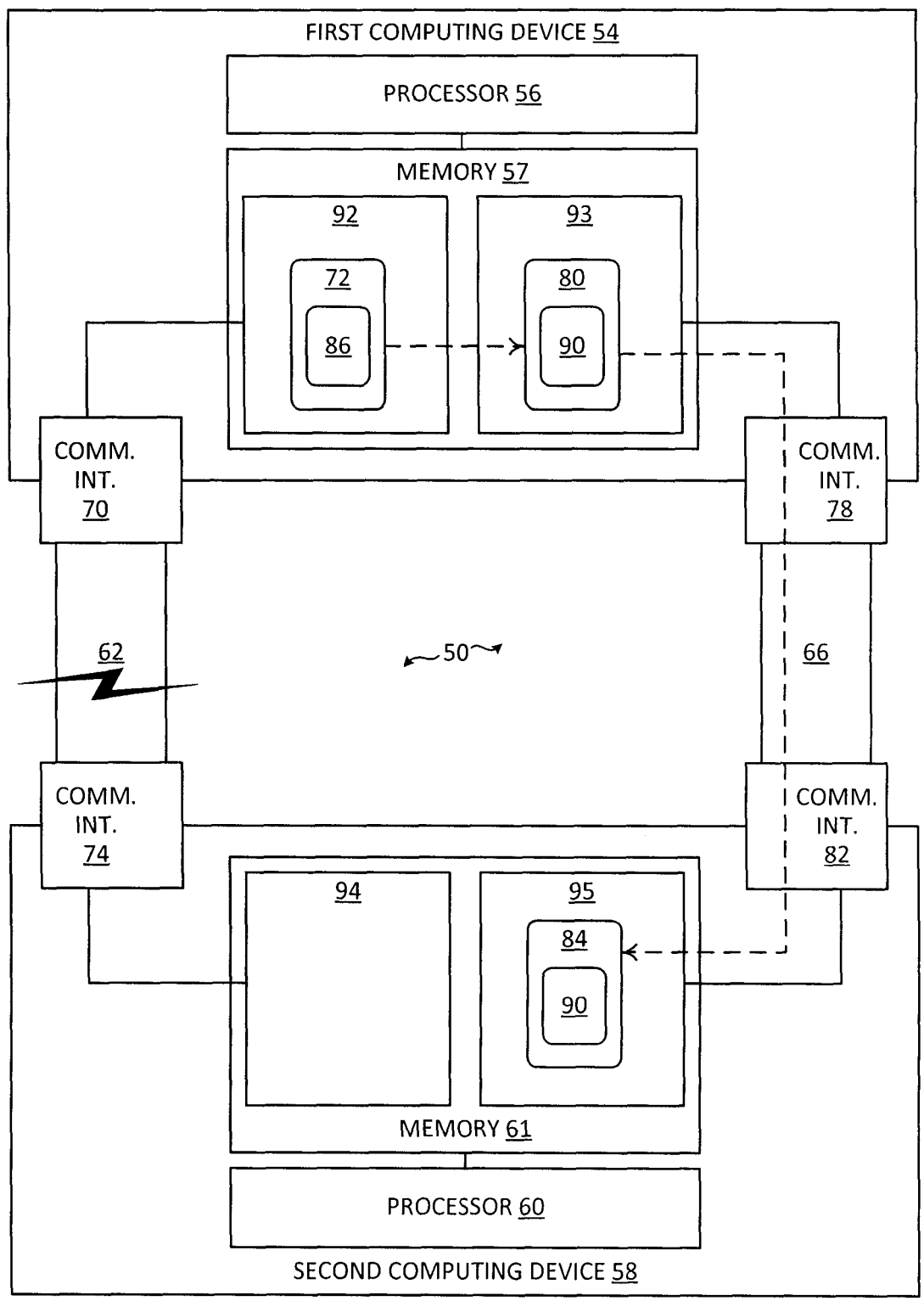
FIG. 4 is a schematic representation of a system for communication link failover in accordance with the embodiment shown in FIG. 1 in a second state.

To further illustrate block 220, and referring to FIG. 4, the system 50 is shown with a failure of the first link 62 to illustrate the operation of the method 200. In this embodiment, the first link 62 is broken due to a physical hardware failure, such as a physical break in the cable connecting the first communications interface card 70 to the second communications interface card 74. It is to be appreciated that failure of the first link 62 shown in FIG. 4 is purely exemplary and it will be apparent to those skilled in the art after reading this description that other types of failures are contemplated. For example, the failure can occur to a number of different errors as recited above.

Referring back to FIG. 3, block 230 comprises copying the queue 72 of messages 86 from the memory space 92 for the first communications interface card 70 to the memory space 93 for the third communications interface card 78 in response to the error detected at block 220. Therefore, as shown in FIG. 4, a queue 80 of messages 90 that is substantially identical to the queue 72 of messages 86 is generated and stored in the memory space 93 associated with the third communications interface card 78. The manner by which the queue 72 of messages 86 is copied is not particularly limited. For example, the messages can be read by the first processor 56 and regenerated in the memory space 93 for the third communications interface card 78. In other embodiments, the first communications interface card 70 and the third communications interface card 78 can directly communicate via a bus internal to the first computing device to transfer the queue contents.

Next, block 240 comprises activating a second PCIe connection across the second link 66 between the third communications interface card 78 and a fourth communications interface card 82. In the present embodiment, the second link 66 can be a cable configured to carry electronic signals from the third communications interface card 78 to the fourth communications interface card 82 based on the PCIe standard. The types of electronic signals carried across the second link 66 are not particularly limited and can include the signals carried across the first link 62. In the present embodiment, driver software is used to direct the communications interface card hardware to generate and to send electronic signals across the second link 66 in accordance with the PCIe standard. The manner in which communication across the second link 66 is established is not particularly limited and can involve the methods of establishing communication across the first link 62 as discussed above. In the present embodiment the first link 62 and the second link 66 are both established when the computing devices 54 and 58 are powered up, but only the first link 62 is actively used for transferring messages under normal operation. The second link 66 is activated at block 240 by confirming operational status of the link and designating the second link as the currently 'active' link.

Block 250 comprises sending the messages 90 of the queue 80 from the third communications interface card 78 to the fourth communications interface card 82 via the second link 66 to arrive at a queue 84 in the memory space 95 associated with the fourth communications interface card 82. Prior to sending the messages, the reading pointer (i.e., head pointer) of the queue 84 is set to point back to the oldest message in the queue 84. The second computer 58 is configured to resume reading messages from the queue 84 starting from the oldest message and to discard any duplicate messages that are received. In this way, the possibility that messages lost during the failure of the first link 62, and the subsequent transition from the first link 62 to the second link 66 is reduced or eliminated without the need for a complex gap recovery mechanism involving the exchange of control messages specifying which messages were lost. The manner by which the messages 90 are sent from the third communications interface card 78 to the fourth communications interface card 82 is not particularly limited and can involve the methods of sending the messages 86 of the queue 72 across the first link 62 as discussed above.

Figure 5:
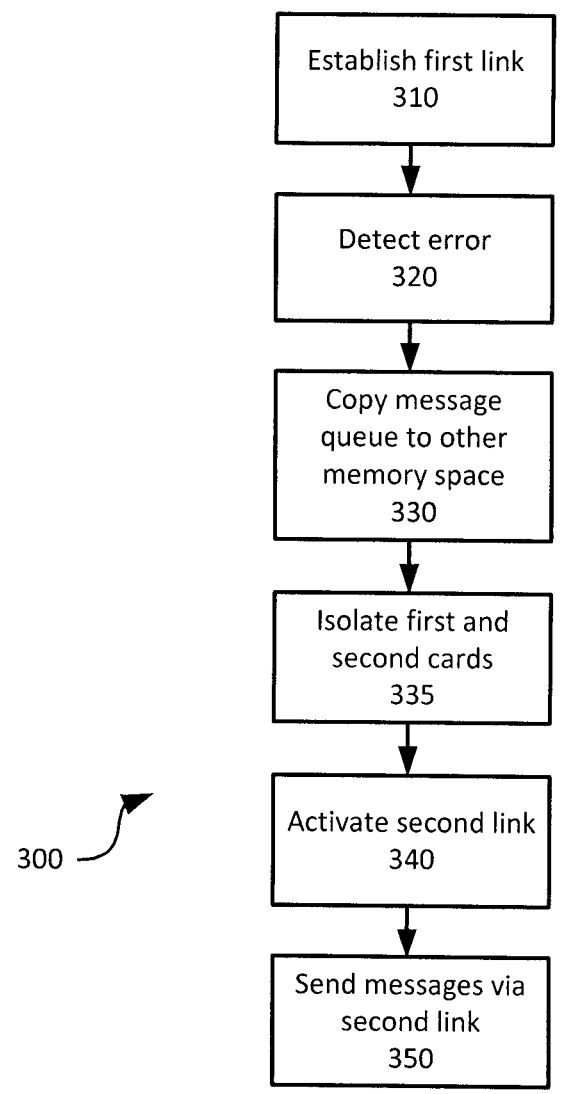
FIG. 5 is a flow chart of a method of communication link failover in accordance with another embodiment.

Referring to FIG. 5, another method for device interconnect failover between a first computing device 54 and a second computing device 58 is represented in the form of a flow-chart and indicated generally at 300. In the present embodiment, the method 300 can be implemented using the system 50 and can be considered a variation of the method 200 described above. However, it is to be understood that the method 300 is not limited to the system 50 and can be implemented on a wide variety of systems.

Beginning at block 310, the first link 62 connects the first communications interface card 70 and the second communications interface card 74. The manner in which signals are sent across the first link 62 is not particularly limited and includes the manners discussed above in connection with block 210.

Block 320 comprises detecting whether an error associated with the first link 62 is present. The manner in which the determination is made is not particularly limited and can involve various detection operations which can be carried out by the first computing device 54, the second computing device 58, or both. In the present embodiment, the detection operation can be carried out on the first communications interface card 70 or the second communications interface card 74 using the drivers associated. Alternatively, the detection operation can be carried out on the processors 56 and 60 of the first computing device 54 or the second computing device 58, respectively using similar operations as those discussed above in connection with block 220.

Referring back to FIG. 5, block 330 comprises copying messages 86 in the queue 72 from the memory space 92 associated with the first communications interface card 70 to the memory space 93 associated with the third communications interface card 78 in response to the error detected at block 320. Therefore, queue contents are copied to the memory space 93 associated with the third communications interface card 78. It is to be appreciated that the content of message queue 80 substantially identical to the content of message queue 72. The manner by which the queue contents are copied is not particularly limited. For example, the queue contents can be read by the processor 56 and regenerated in the memory space associated with the third communications interface card 78.

Block 335 comprises isolating the first communications interface card 70 from the first processor 56 as well as isolating the second communications interface card 74 from the second processor 60. The manner by which the first communications interface card 70 and the second communications interface card 74 are isolated is not particularly limited. In the present embodiment, the first communications interface card 70 and the second communications interface card 74 are powered down by the application issuing a shut-down command to the first and second communications interface cards. In other embodiments, the first processor 56 and the second processor 60 can simply stop sending and/or receiving messages to/from the first communications interface card 70 and the second communications interface card 74, respectively, which would isolate the first communications interface card 70 and the second communications interface card 74 using software means only. In further embodiments, the first computing device 54 and the second computing device 58 can include a mechanism to physically disengage the first communications interface card 70 and the second communications interface card 74 from the first processor 56 and the second processor 60, respectively. Although in the present embodiment both the first communications interface card 70 and the second communications interface card 74 are isolated, it is to be understood that in some embodiments, only one of the communications interface cards is isolated. For example, if the first communications interface card 70 and the second communications interface card 74 are configured to only permit one way communication from the first communications interface card to the second communications interface card, only the first communications interface card 70 would need to be isolated since no data would be sent to the second communications interface card 74.

Next, block 340 comprises activating a second PCIe connection across the second link 66 between the third communications interface card 78 and a fourth communications interface card 82. In the present embodiment, the second link 66 can be a cable configured to carry electronic signals from the third communications interface card 78 to the fourth communications interface card 82 based on the PCIe standard. The types of electronic signals carried across the second link 66 are not particularly limited and can include the signals carried across the first link 62. In the present embodiment, driver software is used to direct the communications interface card to generate and to send electronic signals across the second link 66 in accordance with the PCIe standard. The manner in which communication across the second link 66 is established is not particularly limited and can involve the methods of establishing communication across the first link 62 as discussed above. In the present embodiment the first link 62 and the second link 66 are both established when the computing devices 54 and 58 are powered up, but only the first link 62 is actively used for transferring messages under normal operation. The second link 66 is activated at block 340 by confirming operational status of the link and designating the second link as the currently 'active' link.

Block 350 comprises re-sending, as shown in FIG. 4, the messages 90 in the queue 80 from the memory space 93 associated with the third communications interface card 78 to the memory space 95 associated with the fourth communications interface card 82 via the second link 66. The manner by which the messages 90 are sent from the third communications interface card 78 to the fourth communications interface card 82 is not particularly limited and can involve the methods of sending the messages 86 of the queue 72 across the first link 62 as discussed above.

Figure 6:
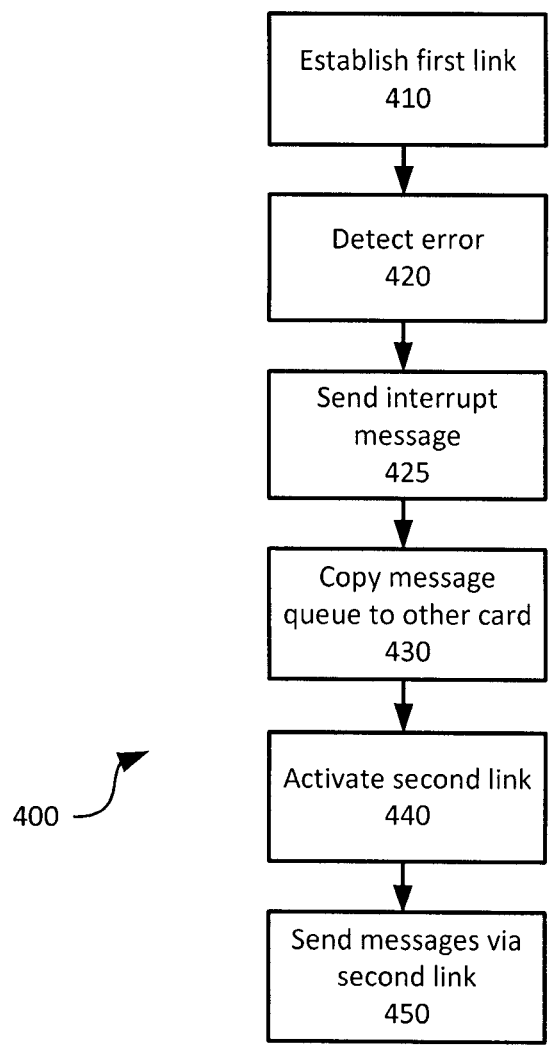
FIG. 6 is a flow chart of a method of communication link failover in accordance with another embodiment.

Referring to FIG. 6, another method for failover of a device interconnect using remote memory access between a first computing device 54 and a second computing device 58 is represented in the form of a flow-chart and indicated generally at 400. In the present embodiment, the method 400 can be implemented using the system 50 and can be considered a variation of the method 200 described above. However, it is to be understood that the method 400 is not limited to the system 50 and can be implemented on a wide variety of systems. Like blocks of the method 400 bear like reference to their counterparts in the method 200. In particular, blocks 410, 420, 430, 440 and 450 are similar to blocks 210, 220, 230, 240 and 250 described above.

Block 425 is particular to method 400 and comprises sending an interrupt message from the second computing device 58 to the first computing device 54 when the second computing device 58 detects that an error has occurred in a received message 86. For example, if the second computing device 58 detects a checksum error, the second computing device 58 can send the interrupt message to the first computing device 54 for notifying the first computing device of the error. The manner in which the interrupt message is sent is not particularly limited and can involve any other type of connection between the first computing device 54 and the second computing device 58. For example, the first computing device 54 and the second computing device 58 can also be connected via a standard network connection. Alternatively, the second link 66 can be used for sending the interrupt message in some embodiments. Once the first computing device 54 receives the interrupt message, the first computing device proceeds with the failover and proceeds to block 430.

Figure 7:
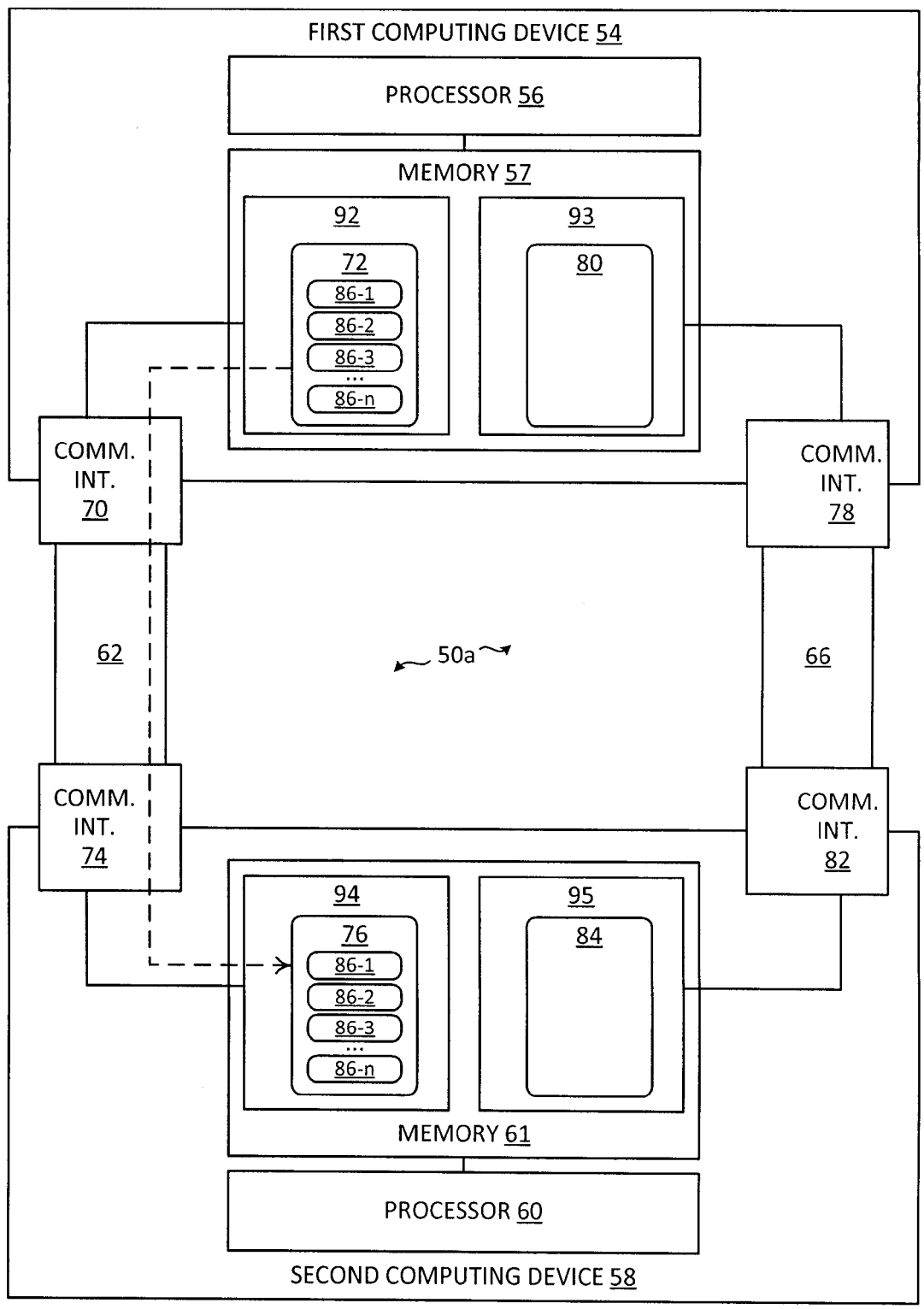
FIG. 7 is a schematic representation of a system for communication link failover in accordance with another embodiment.

Referring now to FIG. 7, another embodiment of a system for device interconnect failover between computing devices is generally shown at 50a during normal operation. Like components of the system 50a bear like reference numerals to their counterparts in the system 50, and the above description can be referenced.

In the present embodiment, the first computing device 54 can be any type of computing device generally configured to send, receive or process a plurality of messages 86-1, 86-2, 86-3 to 86-n in the queue 72 in the memory space 92. The types of messages being sent, received or processed by the first computing device 54, such as the messages 86-1 to 86-n in the queue 72, are not particularly limited. In the present embodiment, the first computing device 54 operates in an on-line trading system, and is thus able to process messages 86-1 to 86-n in the queue 72 that include requests to purchase, sell, cancel, etc. securities that can be traded on-line. For example, the first computing device 54 can be operable to maintain a central matching engine (not shown), where requests are executed against each other, and against a central repository of orders to thereby process the trading of securities.

Similarly, other memory space 93 of the first computing device 54 stores queue 80, and memory spaces 94, 95 of the second computing device 58 store respective queues 76, 84.

Figure 8:
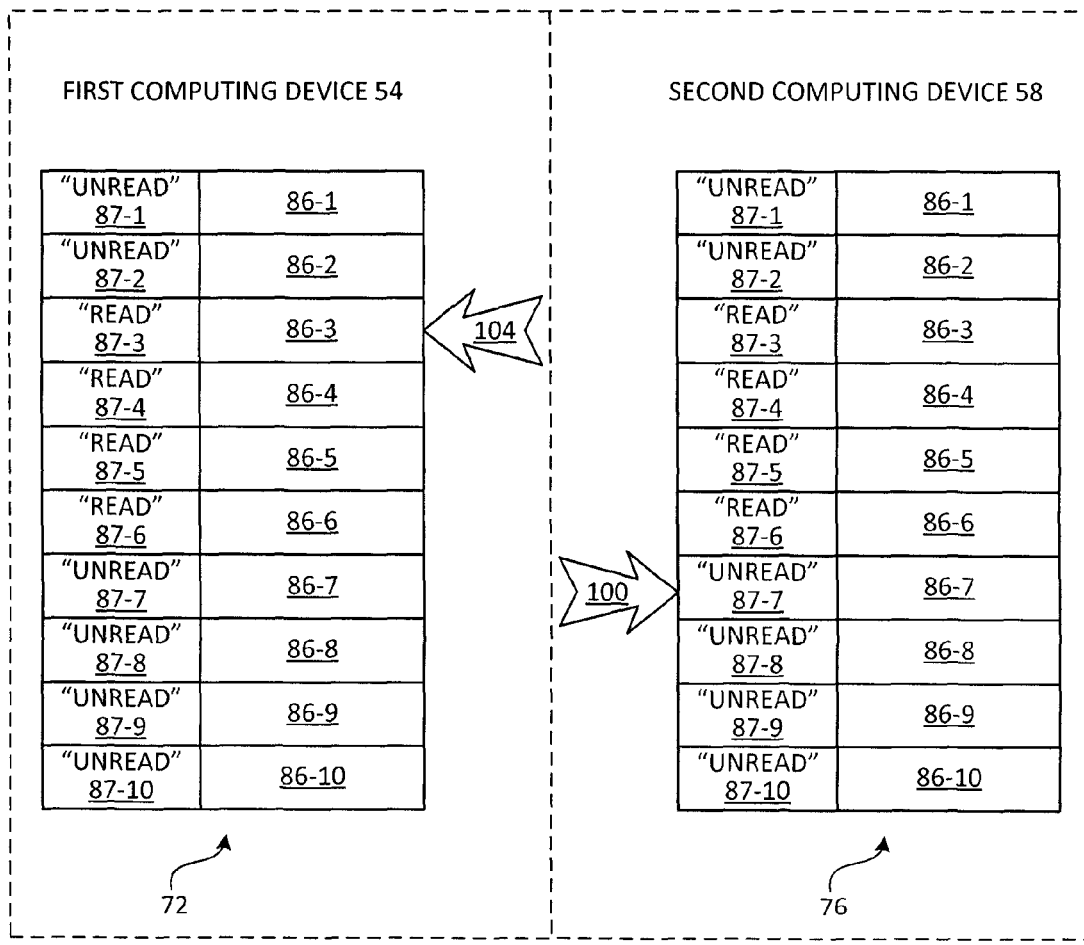
FIG. 8 is a schematic representation of a queue.

Each of the queues 72, 76, 80, and 84 allow for rapid reading and writing to the communications interface cards 70, 74, 78 and 82 using fewer input and output commands. Referring to FIG. 8, a schematic representation of an embodiment of the queues 72, 76 during operation is shown. Queues 80, 84 may be similar or identical. In some embodiments, the queue 72, 76 includes several, e.g., ten, positions for messages 86-1 to 86-10. Associated with each message is a status flag 87-1 to 87-10 indicating whether the message associated with the flag has been read. Since all the messages 86-1 to 86-10 remain in the sequence which the messages were written to the queue 72, the messages can simply be read in the order they appear in the queue 76. For tracking the reading functions of the queue 76, a read pointer 100 identifies the position, such as the seventh position in FIG. 8, of the message 86-7 that is to be transmitted across the first link 62. Similarly, for tracking the writing functions of the queue 72, a write pointer 104 identifies the position of the queue 72, such as the third position in FIG. 8, to be overwritten by a new message (not shown) generated at the first computing device 54.

The read or write pointer can be maintained at the computing device that needs such. For instance, the first computing device 54 need only maintain the write pointer 104 and the second computing device 58 need only maintain the read pointer 100. Exchanging pointer locations across the data link between the computing devices 54, 58 is unnecessary.

In the present embodiment shown in FIG. 8, the message 86-7 is identified by the read pointer 100 to be unread. After the message 86-7 is transmitted the flag 87-7 is flipped to indicate that the message 86-7 has been read and transmitted so that the message 86-7 can be overwritten. The read pointer 100 is then advanced to the next position in the queue 76 containing the message 86-8. Prior to overwriting the message 86-3 at the position indicated by the write pointer 104, the first computing device 54 examines the flag 87-3 to determine if the message 86-3 has been transmitted. If the flag 87-3 indicates the message 86-3 pointed to by the write pointer 104 has been transmitted, the message 86-3 is overwritten. Furthermore, the flag 87-3 is flipped to indicate that the message 86-3 is now unread. The write pointer 104 is then advanced to the next position in the queue 72 containing the message 86-4. It is to be appreciated with the benefit of this description that the flags 87-1 to 87-10 serve to prevent the first computing device 54 from overwriting a message that has yet to be transmitted.

The queue 72, 76 may be circular, in that when a pointer 100, 104 is to be advanced past the last message 86-10, the pointer 100, 104 is returned to the first message 86-1.

Figure 10:
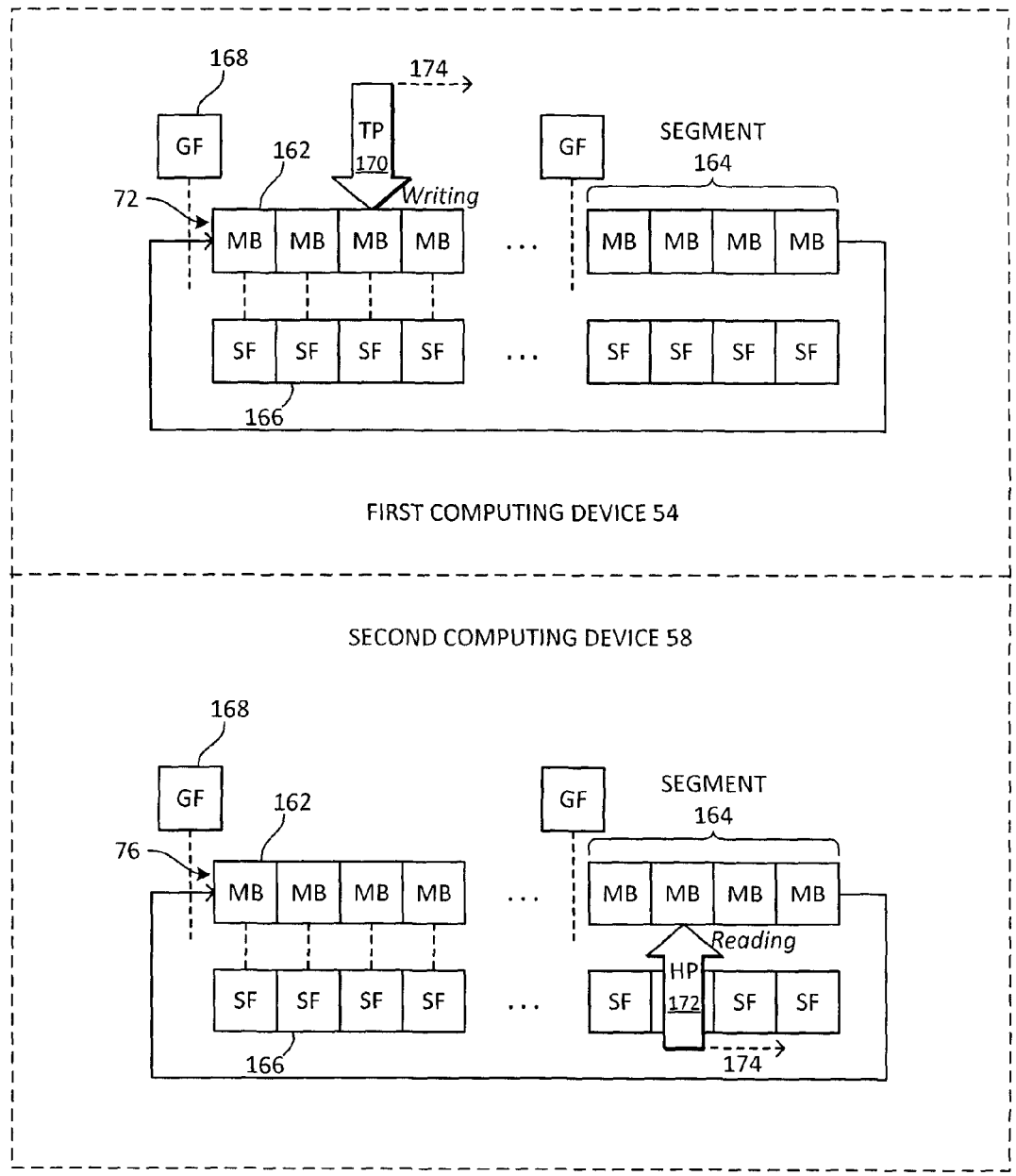
FIG. 10 is a schematic diagram of a segmented queue.

FIG. 10 shows another embodiment of a queue that can be used for the queues 72, 76, 80, 84, with queues 72, 76 being taken as the illustrated example. The queue is segmented and may eliminate the possibility that messages are lost during the failure of the first link 62, and the subsequent transition from the first link 62 to the second link 66, without the need for a complex gap recovery mechanism, such as the kind involving the exchange of control messages specifying which messages were lost.

The queue is shown in FIG. 10 and is configured as a circular queue with no overrun, meaning that there are a fixed number of buffers in the queue, and once the queue is full, the write operation cannot wrap around and over-write a buffer containing an un-read message. This feature prevents messages in the queue being lost due to over-writing, without the need for exchanging head pointer location information and tail pointer location information across the data link. In this case, the write operation must wait for the read operation to free up a message buffer by reading the contents and clearing the buffer status flag, as such a write operation can only occur if empty message buffers are available to the writing entity. Furthermore, the read operation must finish reading all the message buffers in the next queue segment and grant access to this segment before the write operation may proceed. The advantage of a circular queue is that the fixed number of buffers prevents the possibility of the queue space growing without bounds, eventually depleting the memory of the computing device, resulting in a system failure. Another advantage of a circular queue in low-latency systems is that all the message buffers in the queue are pre-allocated from system main memory at start time, avoiding the relatively lengthy process of allocating a new message buffer from system main memory each time a new message is added to the queue. It is apparent that optimal latency is achieved if the writing operation never has to wait for a queue segment of available message buffers to be made available by the reading operation. It is thus advantageous to configure the system such that the reading operation occurs more frequently than the writing operation, otherwise, if the writing operation occurs more frequently than the reading operation, the queue will tend to fill up and the write operation will have to poll the queue waiting for access to be granted to the next queue segment by the read operation freeing up all the message buffers in that segment. This can advantageously reduce latency, particularly in a remote memory access device interconnected system.

Each queue 72, 76 includes a plurality of message buffers 162 divided into at least two queue segments 164. The message buffers 162 can be implemented as a linked list and as a circular queue, meaning that the last buffer in the queue is linked back to the first buffer in the queue. In this embodiment, the queue is of fixed length, i.e., contains a fixed number of message buffers 162. The message buffers 162 are configured to buffer data messages, such as messages 86, 90, 86-1/n, and 90-1/n discussed elsewhere herein.

Each of the message buffers 162 can be of any practical size, such as one or a multitude of bytes. Each queue segment 164 can contain two or more message buffers 162, and not all queue segments 164 need have the same number of message buffers 162. Any practical number of queue segments 164 can be used, although two segments can be advantageous.

A message status flag 166 is provided for each message buffer 162. Each status flag 166 can have a length of one byte or other convenient length and, for example, can be the first or the last byte of the respective message buffer 162. One state of the status flag 166 indicates that the message in the respective message buffer 162 is valid or "en-queued" and is ready to be read (unread). The valid state can be selected to be a non-zero value (e.g., a hexadecimal value other than 00). The other state of the status flag 166 indicates that the message in the respective message buffer 162 is invalid or "de-queued" and has already been read. The invalid state can be selected to be a zero value (e.g., a hexadecimal value of 00). The status flag 166 is checked for the valid state as a condition for reading from the respective message buffer 162. After reading the message, status flag is set to the invalid state as part of the reading operation.

A segment guard flag 168 is provided for each of the queue segments 164. Each guard flag 168 can have a length of one byte or other convenient length. One state of the guard flag 168 indicates that the respective queue segment 164 is open to receive new messages and new messages can be written to message buffers 162 in the segment 164. This condition exists as long as the read pointer is not indicating any message buffer in the segment. The open state can be selected to be a zero value (e.g., a hexadecimal value of 00). The other state of the guard flag 168 indicates that the respective queue segment 164 is closed to receiving new messages and new messages should not be written to message buffers 162 in the segment 164. This condition exists as long as the read pointer is indicating one of the message buffers 162 in the segment 164. To achieve low latency, the write operation does not check the status of each message buffer before writing, saving the time it would take to perform an additional read operation. Instead, the write pointer is only permitted to advance into a queue segment if all the message buffers are available to write. Thus, the write operation can proceed with unchecked speed through the queue segment until it writes the last message buffer in that segment. The segment guard flag 168 closed state can be selected to be a specific non-zero value (e.g., a hexadecimal value of FF). The guard flag 168 is checked for the open state as a condition for writing to the message buffers 162 in the respective queue segment 164. When messages are being read from a queue segment 164, the guard flag is set to the closed state. Upon completion of reading the last message from the queue segment 164, the guard flag 168 is set to the open state, clearing the way for the following write pointer to advance into the segment. The advantage of the use of segmented queues in this way is that the first computing device 54 does not need to keep track of the location of the head pointer, nor does it need to receive updates as the location of the head pointer changes. It only needs to check for permission to advance the tail pointer into the next queue segment. This substantially reduces the number of control messages that must otherwise be exchanged across the data links 62 and 66, further improving message throughput and latency.

Two pointers 170, 172 are used to write to and read from the queue 72, 76. The tail pointer 170 is referenced when writing a message to a message buffer 162 of the queue 72 and is advanced in a direction 174 through the queue 72. The tail pointer 170 need only be tracked by and known to the first computing device 54. The head pointer 172 is referenced when reading a message from a message buffer 162 of the corresponding queue 76 and is advanced in the same direction 174 through the queue 76. Advancement of the tail pointer 170 is controlled, at least in part, by the state of the guard flag 168 of the next queue segment 164. Advancement of the head pointer 172 is controlled, at least in part, by the state of the status flag 166 of the next message buffer 162. Each guard flag 168 prevents the tail pointer 170 from entering a segment 164 that corresponds to a message buffer 162 to which the head pointer 172 points, so that messages in the message buffers 162 of the segment 164 are protected from being prematurely overwritten. The status flags 166 prevent the head pointer 172 from advancing to a message buffer 162 that contains an already read, old message.

When this kind of queue is used for the queues 72, 76, 80, 84, the first computing device 54 maintains the tail pointer 170 to write messages and the second computing device 58 maintains the head pointer 172 to read messages. That is, the first computing device 54 writes messages at the tail pointer 170 of the active queue 72, 80, obeying the guard flags 168 whose states are set by the second computing device 58 and received at the first computing device 54. The second computing device 58 reads messages from its active queue 76, 84, obeying the status flags to prevent re-reading old messages. After failover to the queues 80, 84 associated with the second link 66, the second computing device 58 need only move the head pointer 172 back to the first message buffer 162 of the currently written segment 164, with the second computing device 58 discarding any duplicate messages read. For example, when the first computing device 54 copies the queue 72 to the queue 80 in the memory space 93, the processor 56 can set the message status flags 166 of the read segment 162 back to "valid", with the remote memory access function mapping such flags to the queue 84 at the second computing device 58, so that the head/read pointer 172 can re-read such messages. Alternatively, the second computing device 58 can detect the failover mode and reset the status flags 166 and re-read the messages. This can eliminate the possibility that messages are lost during the failure of the first link 62 and activation of the second link 66.

In addition, the segmented queue shown in FIG. 10 allows for detection of another kind of error associated with the link between the computing devices 54, 58, where such error can be used to trigger the failover process. If the tail pointer 170 waits for a guard flag 168 to open for longer than a predetermined period of time, then the first computing device 54 can determine that an error has occurred in the link 62 and can trigger the failover process discussed elsewhere herein. For example, a timer can be used to measure the time that the tail pointer 170 points to a last message buffer 162 in a segment 164, and if such time exceeds a threshold then determination of an error can be made. Hence, if the tail pointer 170 does not advance to the next segment for a period of time, it can be assumed that some kind of link failure has occurred.

The queues described in FIGS. 8 and 10 are schematic, non-limiting representations only. For example, although specific numbers of memory positions/buffers are shown, it is to be understood that a queue can be implemented to include any number of positions. It is to be appreciated that a larger number of positions allow for more messages to be processed in a queue segment before having to transition to the next queue segment which may result in better performance. However, more positions in a queue may use a larger amount of memory, and may potentially require the retransmission of more duplicate messages to recover from primary link failure.

Similar to the first computing device 54, the second computing device 58 can be any type of computing device generally configured to send, receive or process the messages 86-1 to 86-n. In the present embodiment, the second computing device 58 has an identical (or at least substantially identical) computing environment as the first computing device 54. The messages 86-1 to 86-n are transmitted from the first computing device 54 to the second computing device 58 in the same order that the messages 86-1 to 86-n are stored in the queue 72.

The first link 62 is generally configured to carry electronic signals representing the messages 86 between the first computing device 54 and the second computing device 58. In the present embodiment, the first link 62 is a cable configured to carry electronic signals from the first communications interface card 70 to the second communications interface card 74 based on the PCIe standard. It is to be appreciated that the first link 62 provides a direct connection between the first computing device 54 and the second computing device 58 using a protocol based on the PCIe standard without any intermediary protocols. Therefore, the plurality of messages 86-1 to 86-n is transmitted from the queue 72 associated with the first communications interface card 70 to the queue 76 associated with the second communications interface card 74 in the same order that the plurality of messages 86-1 to 86-n were generated in the queue 72 such that the plurality of messages 86-1 to 86-n will be stored in the queue 76 in the same order.

Figure 9:
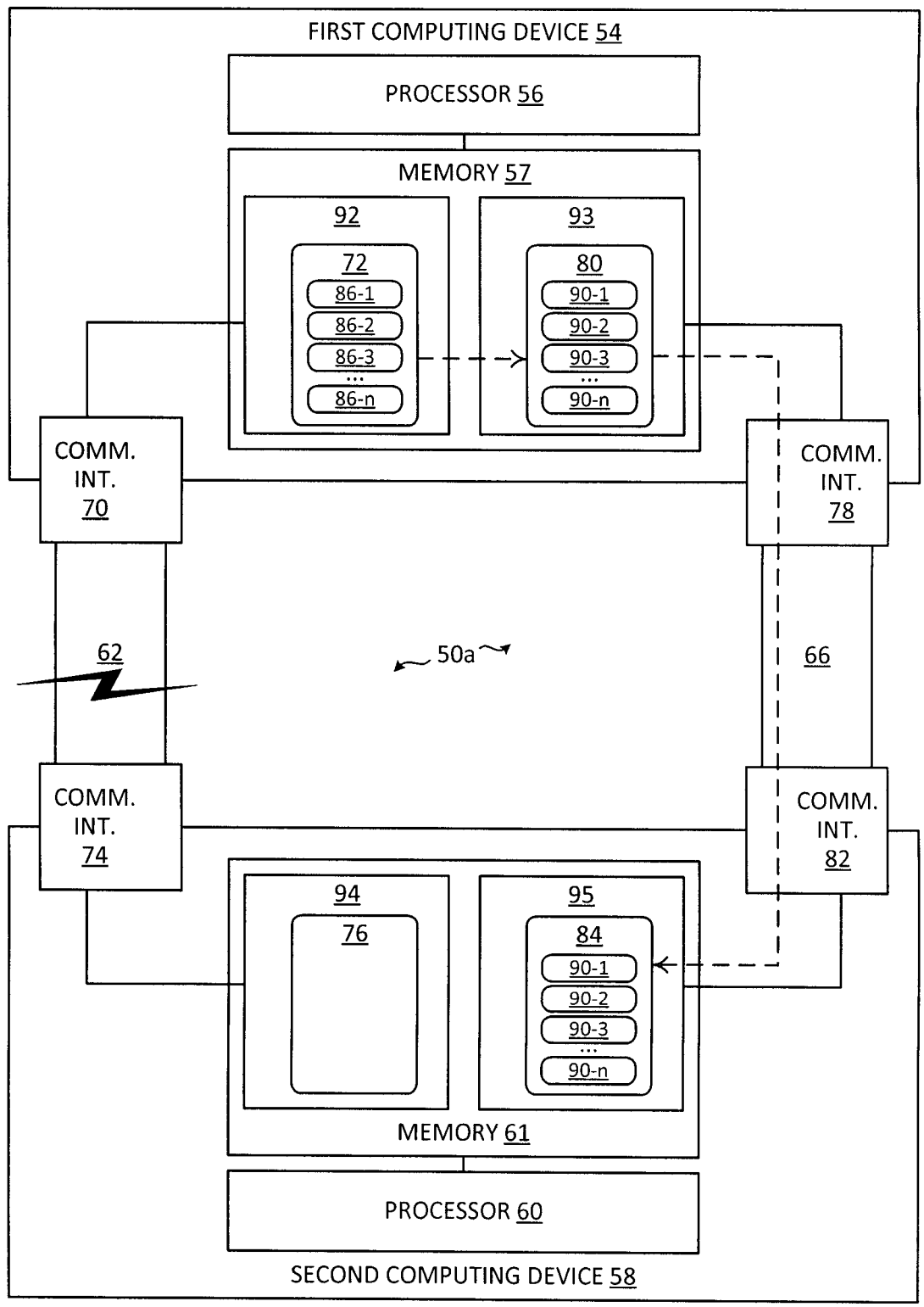
FIG. 9 is a schematic representation of a system for communication link failover in accordance with the embodiment shown in FIG. 7 in a second state.

During a failover as shown in FIG. 9, the plurality of messages 86-1 to 86-n in the entire queue 72 is copied by the first processor 56 to the queue 80 in the memory space 93 associated with the third communications interface card 78 as mirrored messages 90-1, 90-2, 90-3 to 90-n in the same order as the plurality of messages 86-1 to 86-n were stored. It is to be appreciated that after the copying of the plurality of messages 86-1 to 86-n, the queue 80 is substantially identical to the queue 72, and the remote memory access service will transfer the copied queue 80 in its entirety across data link 66 to queue 84. The manner by which the plurality of messages 86-1 to 86-n is copied is not particularly limited. For example, the plurality of messages 86-1 to 86-n can be sequentially read by the first processor 56 and regenerated in the queue 80.

In the present embodiment, the queue 84 is re-read from the oldest message and the second computing device 58 compares the sequence numbers of the messages 90 received at the queue 84 with the sequence numbers of the messages 86 in the queue 76 to determine where the link failure occurred. Messages that were successfully received at queue 76 before the link failure are discarded at queue 84 as duplicates. The first unique sequence number encountered at queue 84 indicates the point in message transmission where the link failure occurred. The corresponding read pointer for the queue 84 would be set in order to continue processing the messages. Therefore, it is to be appreciated that any gap generated by the error has been reconciled without requiring an exchange of lost message sequence number information between the computing device 58 and the computing device 54, and without the computing device 54 having to track successful receipt of messages and movement of the head pointer 172 by the computing device 58. Although all the messages in the queue 72 are copied in this embodiment, other embodiments can copy only the messages 86 which have not been received by the second communications interface card 74 from the queue 72 to the queue 80. However, it is to be appreciated that determining which messages 86 have been successfully transferred can involve more computing resources and more information transfer between the computing device 58 and the computing device 54, leading to a longer delay between sending successive message during normal operation, and a longer delay after fail over before the messages 86 begin being sent across the second link 66.

Similar to the first link 62, the second link 66 is generally configured to carry electronic signals representing the messages 90-1 to 90-n from the first computing device 54 to the second computing device 58. In the present embodiment, the second link 66 is a cable configured to carry electronic signals from the third communications interface card 78 to the fourth communications interface card 82 using a protocol based on the PCIe standard. In the present embodiment, under normal operation, the second link 66 is typically dormant such that no messages are sent over the second link 66. In other embodiments, the first link 62 and the second link 66 can alternate being a primary link such to reduce the chance of traffic contention and to continuously validate the operability of both links in case one fails and the other must take over sole responsibility for transferring data.

In the present embodiment, the first communications interface card 70 is generally configured to transmit the plurality of messages 86-1 to 86-n from the queue 72 on the first computing device 54 to the second computing device 58 via the first link 62. The first communications interface card 70 is not particularly limited and can be any type of communications interface card that supports remote memory access configured to send messages via a low latency link, such as a PCIe link. As discussed above, a low latency link is any device interconnect that supports an implementation of remote memory access, and preferably does not implement network layer services associated with additional processing overhead found in some protocols, such as TCP/IP. It is to be understood with the benefit of this description that the queue 72 is comprised within a memory space 92 for storing the messages 86-1 to 86-n. The type of memory used is not particularly limited and can be volatile or non-volatile. In the present embodiment, a volatile memory component is used to store the messages 86-1 to 86-n to provide fast access to the messages 86-1 to 86-n.

The second communications interface card 74 is generally configured to receive the messages 86-1 to 86-n from the first computing device 54 via the first link 62. The second communications interface card 74 is not particularly limited and can be any type of communications interface card configured to receive messages via a low latency device interconnect that supports remote memory access, which can include the types discussed above in connection with the first communications interface card 70. In the present embodiment, the second communications interface card 74 is identical to the first communications interface card 70.

Similar to the first communications interface card 70 and the second communications interface card 74, the third communications interface card 78 and the fourth communications interface card 82 are generally configured to communicate with each other via the second link 66. In the present embodiment, the third communications interface card 78 and the fourth communications interface card 82 are identical to the first communications interface card 70 and the second communications interface card 74 and are associated with the queues 80 and 84, respectively.

It is to be understood that variations of the portable electronic devices and methods described above are contemplated. As a non-limiting example, the method 300 can be combined with the features of the method 400 where an interrupt message is sent as well as isolating the first and second communications interface cards. As another example, the transmission of data across the second link 66 of the system 50 can mirror the transmission of the message 86 being transmitted over the first link 62 to provide a redundant link. Similarly, the system 50a can mirror the transmission of the messages 86-1 to 86-n being transmitted over the first link 62 over the second link 66 to provide a redundant link. Furthermore, although the systems 50 and 50a use a cable connection, the first link 62 and the second link 66 can be implemented as a wireless link or any other type of connection capable of supporting remote memory access between the first computing device 54 and the second computing device 58, respectively.

While specific embodiments have been described and illustrated, the scope of the claims should not be limited by the preferred embodiments set forth above, but should be given the broadest interpretation consistent with the description as a whole.

What is claimed is:

1. A method of device interconnect failover between a first computing device and a second computing device, the method comprising:
   establishing a first remote memory access link between a first communications interface card on the first computing device and a second communications interface card on the second computing device; and
   detecting an error associated with the first remote memory access link, and in response to the error:
      copying all messages from a primary segmented queue associated with the first communications interface card to a backup segmented queue associated with a third communications interface card on the first computing device, wherein each message includes a request for processing an order by the first computing device;
      activating a second remote memory access link between the third communications interface card and a fourth communications interface card on the second computing device;
      resending messages from the backup segmented queue associated with the third communications interface card to the fourth communications interface card through the second remote memory access link; and
      the second computing device discarding duplicate received messages, if any.

2. The method of claim 1, wherein resending comprises resending messages of a current segment of the backup segmented queue associated with the third communications interface card on the first computing device, the current segment being a segment containing a write pointer.

3. The method of claim 1, wherein the error comprises an error event in the first communications interface card.

4. The method of claim 1, wherein the error comprises a checksum error.

5. The method of claim 1, wherein the error comprises a physical disruption of the first remote memory access link.

6. The method of claim 1, wherein the error comprises failure to receive a message within a predetermined period of time.

7. The method of claim 1, wherein the error comprises determining that a tail pointer of the primary segmented queue has not advanced into a next segment of the primary segmented queue for a period of time.

8. The method of claim 1, further comprising sending an interrupt message from the second computing device to the first computing device.

9. The method of claim 8, wherein the interrupt message is for notifying the first computing device of the error.

10. The method of claim 1, further comprising isolating the first communications interface card from the first computing device and isolating the second communications interface card from the second computing device in response to the error.

11. The method of claim 1, further comprising reconciling a gap generated by the error.

12. A system comprising:
   a first computing device; and
   a second computing device connected to the first computing device via a first remote memory access link and a second remote memory access link;
   the first computing device configured to, in response to detecting an error with the first remote memory access link, copy all messages from a primary segmented queue associated with the first remote memory access link to a backup segmented queue associated with the second remote memory access link, wherein each message includes a request for processing an order by the first computing device, and resend messages from the backup segmented queue associated with a second remote memory access link to the second computing device; and
   the second computing device configured to discard duplicate receive messages.

13. The system of claim 12, wherein at least one of the first computing device and the second computing device is configured to activate the second remote memory access link in response to detection of the error.

14. The system of claim 12, wherein the first computing device comprises a first communications interface card and the second computing device comprises a second communications interface card, the first remote memory access link comprising the first communications interface card and the second communications interface card, and wherein the first computing device comprises a third communications interface card and the second computing device comprises a fourth communications interface card, the second remote memory access link comprising the third communications interface card and the fourth communications interface card.

15. The system of claim 14, wherein the error comprises an error event in the first communications interface card.

16. The system of claim 14, wherein the first computing device is configured to isolate the first communications interface card in response to the error, and wherein the second computing device is configured to isolate the second communications interface card in response to the error.

17. The system of claim 12, wherein the first computing device is configured to resend messages of a current segment of the primary segmented queue associated with the first remote memory access link, the current segment being a segment containing a write pointer.

18. The system of claim 12, wherein the error comprises a checksum error.

19. The system of claim 12, wherein the error comprises a physical disruption of the first remote memory access link.

20. The system of claim 12, wherein the error comprises failure to receive a message within a predetermined period of time.

21. The system of claim 12, wherein the second computing device is configured to send an interrupt message to the first computing device.

22. The system of claim 21, wherein the interrupt message is for notifying the first computing device of the error.

23. The system of claim 12, wherein at least one of the first computing device and the second computing device is configured to reconcile a gap generated by the error.

24. A method of device interconnect failover between a first computing device and a second computing device, the method comprising:

establishing a first remote memory access link between the first computing device and the second computing device; and detecting an error associated with the first remote memory access link, and in response to the error:

the first computing device copying all messages from a primary segmented queue associated with the first remote memory access link to a backup segmented queue associated with the second remote memory access link, wherein each message includes a request for processing an order by the first computing device;

activating the second remote memory access link between the first computing device and the second computing device;

the first computing device resending messages from the primary segmented queue associated with the first remote memory access link through the second remote memory access link to the second computing device; and the second computing device discarding duplicate received messages, if any.

* * * * *